United States Patent [19]

Kang

[11] Patent Number: 5,019,921
[45] Date of Patent: May 28, 1991

[54] POP NOISE REMOVING CIRCUIT FOR A DOUBLE DECK CASSETTE TAPE RECORDER

[75] Inventor: Yang M. Kang, Kyunggi, Rep. of Korea

[73] Assignee: Samsung Electronics Co., Ltd., Rep. of Korea

[21] Appl. No.: 256,482

[22] Filed: Oct. 12, 1988

[30] Foreign Application Priority Data

Oct. 13, 1988 [KR] Rep. of Korea .............. 1987-17488

[51] Int. Cl.⁵ .............................................. G11B 5/02
[52] U.S. Cl. ..................................................... 360/67
[58] Field of Search ....................... 360/67, 68, 61, 60

[56] References Cited

U.S. PATENT DOCUMENTS

| | | | |
|---|---|---|---|
| 3,591,730 | 7/1971 | Chang | 360/61 |
| 3,995,315 | 11/1976 | Miller | 360/67 |
| 4,354,209 | 10/1982 | Sato et al. | 360/67 |
| 4,542,421 | 9/1985 | Fujibayashi | 360/67 |

FOREIGN PATENT DOCUMENTS 1542321 3/1979 United Kingdom .
2056208 3/1981 United Kingdom .
2084825 4/1982 United Kingdom .

*Primary Examiner*—Donald McElheny, Jr.
*Attorney, Agent, or Firm*—Saidman, Sterne, Kessler & Goldstein

[57] ABSTRACT

A pop noise removing circuit for a double deck cassette tape recorder, which can thoroughly remove the pop noise occurring during the actuation of two deck leaf switches to drive deck motors. The circuit comprises means detecting ON-OFF operation of the deck leaf switches and generating control signals in response to the ON-OFF operation of the deck leaf switches, and means for muting left and right channel output signals from a head switching integrated circuit in dependence upon the control signals generated by the detecting means.

3 Claims, 2 Drawing Sheets

POP NOISE REMOVING CIRCUIT FOR A DOUBLE DECK CASSETTE TAPE RECORDER

BACKGROUND OF THE INVENTION

1. Field of the Invention

The present invention relates to a pop noise removing circuit for a double deck cassette tape recorder, and more particularly, to a circuit for removing pop noise which occurs during the actuation of deck leaf switches to drive deck motors.

2. Description of the Prior Art

In general, deck leaf switches for a double deck cassette tape recorder control the power supply to a head switching integrated circuit (IC) for switching two audio heads, and the head switching IC outputs left and right channel audio signals. In this type of double deck cassette tape recorder, the left and right channel output signals become unstable because pop noises occur instantaneously in the head switching IC during the ON-OFF operation of the deck leaf switches.

In order to remove such pop noises, conventional double deck cassette tape recorders employ resistors and capacitors which are connected between the leaf switches and the head switching IC respectively and which can delay the power supply to the head switching IC during the actuation of the leaf switches. However, these conventional cassette tape recorders have a drawback that it is impossible to remove the pop noises thoroughly.

SUMMARY OF THE INVENTION

It is an object of the present invention to provide a pop noise removing circuit for a double deck cassette tape recorder which can thoroughly remove pop noises occuring during the ON-OFF operation of the deck leaf switches.

In accordance with the present invention, there is provided an improve system for automatically muting left and right channel output signals during the actuation of the deck leaf switches.

More particularly, in accordance with the invention, there is provided a pop noise removing circuit for a double deck cassette tape recorder having deck leaf switches and a head switching IC, comprising:

- means detecting ON-OFF operation of the deck leaf switches and generating control signals in response to the ON-OFF operation of the deck leaf switches; and
- means for muting the left and right channel output signals from the head switching IC in dependence upon the control signals.

BRIEF DESCRIPTION OF THE DRAWINGS

This invention will now be described by way of illustrative example with reference to the accompanying drawings, in which.

DESCRIPTION OF THE PREFERRED EMBODIMENT

Figure 1:
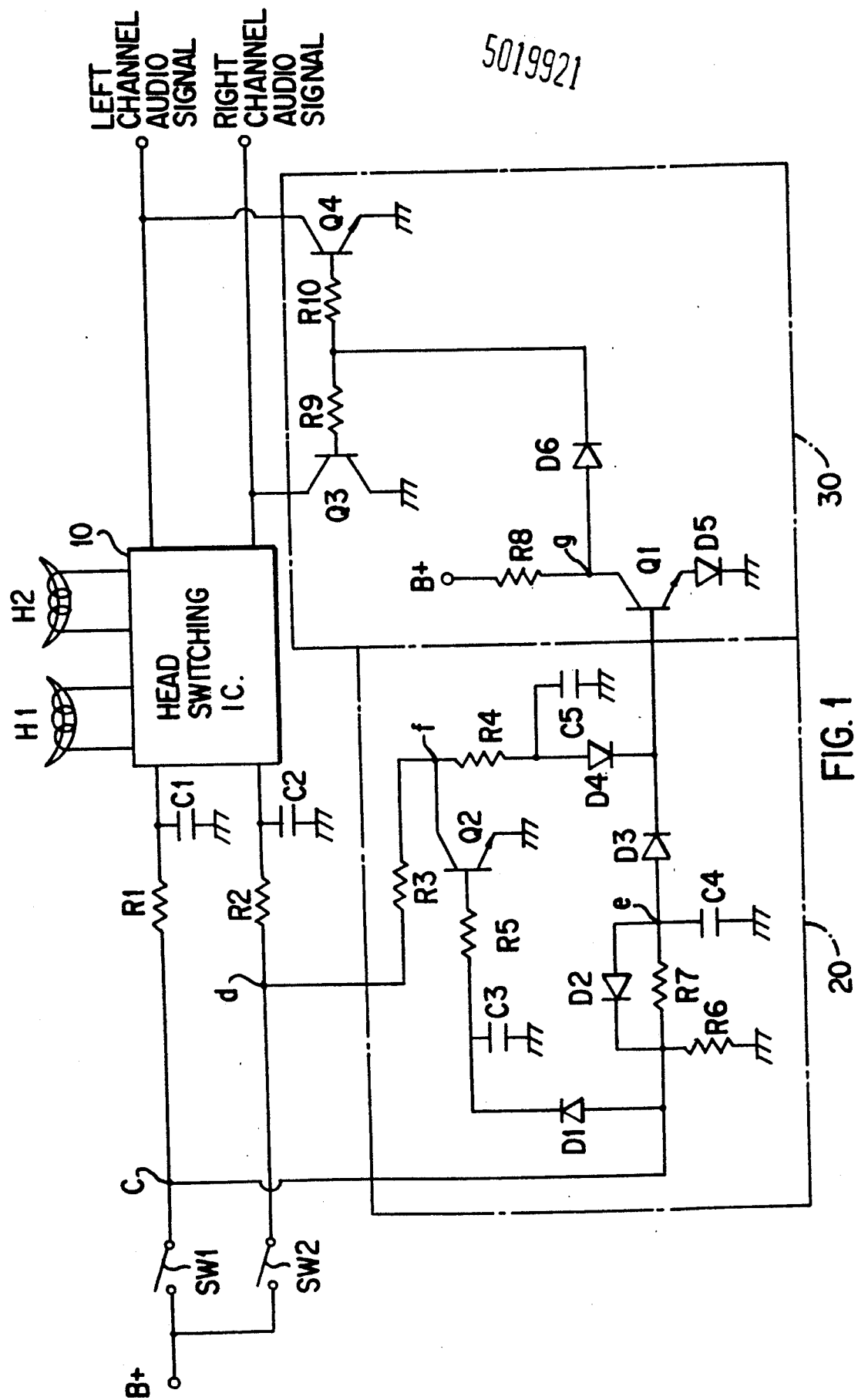
FIG. 1 is a circuit diagram of the embodiment of the present invention.

Referring to FIG. 1, the power supply B+ through the deck leaf switch $SW_1$ or $SW_2$ is applied to the head switching IC 10 through the resistors $R_1$ and $R_2$ and the capacitors $C_1$ and $C_2$ respectively, and the head switching IC 10 switches the head $H_1$ or $H_2$ on/off. More particularly, an electronic switch (not illustrated) constituted within the head switching IC 10 is connected to the head $H_1$ or $H_2$ by means of the deck leaf switch $SW_1$ or $SW_2$ so that the head switching IC 10 outputs the left and right channel audio signals.

The ON-OFF operation of the deck leaf switches $SW_1$ and $SW_2$ is dectected by a detector section 20 and during the ON-OFF operation of the deck leaf switches $SW_1$ and $SW_2$, control signals generated from the detector section 20 are fed to a muting section 30.

Firstly, when the deck leaf switch $SW_1$ is on, the power supply B+ through the deck leaf switch $SW_1$ is applied to the base of a transistor $Q_1$ in the muting section 30 through a first timing circuit consisting of resistors $R_6$ and $R_7$ connected in parallel, diodes $D_2$ and $D_3$ and a capacitor $C_4$ in the detector section 20 as well as to the base of a transistor $Q_2$ through a third timing circuit consisting of a diode $D_1$, a capacitor $C_3$ and a resistor $R_5$.

On the other hand, when the deck leaf switch $SW_2$ is on, the power supply B+ through the deck leaf switch $SW_2$ is applied to the collector of the transistor $Q_2$ through a resistor $R_3$, and to the base of the transistor $Q_1$ through a second timing circuit consisting of a resistor $R_4$, a capacitor $C_5$ and a diode $D_4$.

When the transistor $Q_1$ in the muting section 30 is turned on, the power supply B+ applied to the collector of the transistor $Q_1$ passes to ground through the collector/emitter conductive path of the transistor $Q_1$. On the contrary, when the transistor $Q_1$ is turned off, the power supply B+ applied to its collector is then applied to the bases of transistors $Q_3$ and $Q_4$ through a diode $D_6$ and bias resistors $R_9$ and $R_{10}$ for respectively muting the left and right channel audio signals from the head switching IC 10.

Referring again to FIG. 1, when both of the deck leaf switches $SW_1$ and $SW_2$ are off, the power supply B+ is not applied to the head switching IC 10 and the electronic switch in the head switching IC 10 cuts out the connection with the heads $H_1$ and $H_2$. At this moment, the base voltage of the transistor $Q_1$ becomes LOW and the transistor $Q_1$ is turned off. Therefore, the transistors $Q_3$ and $Q_4$ are both turned on because the power supply B+ through the resistor $R_8$ and the diode $D_6$ is applied to the bases of the transistors $Q_3$ and $Q_4$ through the resistors $R_9$ and $R_{10}$ respectively. Thus, when the deck leaf switches $SW_1$ and $SW_2$ become off, output terminals of the left and right channel audio signals are connected to ground through the collector/emitter conductive paths of the transistors $Q_3$ and $Q_4$ and thus the left and right channel audio signals are muted.

Figure 2A:
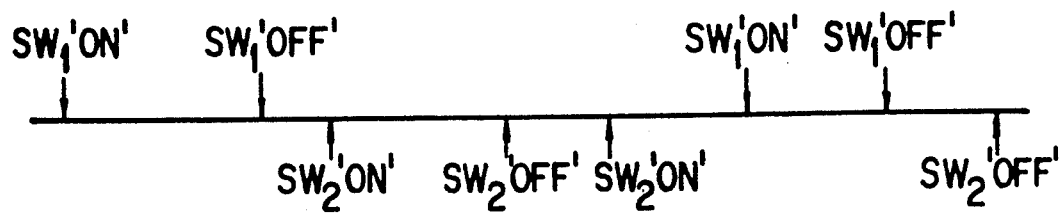
FIGS. 2(A-G) are a timing chart for dipicting the waveforms appeared at various points in FIG. 1 during the actuation of the deck leaf switches.
Figure 2B:
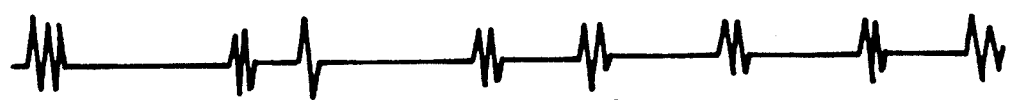
Figure 2C:

When the deck leaf switch $SW_1$ is on as shown in FIG. 2(A), the waveform of FIG. 2(C) appears at point c due to the power supply B+ applied through the deck leaf switch $SW_1$. However, the pop noise as shown in FIG. 2(B) occurs in the head switching IC 10 due to the difference between switching times of the head switching IC 10 and the deck leaf switch $SW_1$. The power supply B+ through the deck leaf switch $SW_1$ is applied to the head switching IC 10 after somewhat moderated by the resistor $R_1$ and the capacitor $C_1$ and drives the head $H_1$. But the left and right channel output signals becomes unstable because the pop noise is not thoroughly removed. However, at this moment, the left and right channel output signals from the head switching IC 10 pass to ground because both of the transistors $Q_3$ and $Q_4$ are turned on as described above. Simultaneously, the power supply B+ is charged to the capacitor $C_4$ through the resistors $R_6$ and $R_7$ in the detector section 20 and accordingly, the voltage waveform as shown in FIG. 2(E) appears at point e. As this voltage waveform is applied to the base of the transistor $Q_1$ through the diode $D_3$, the transistor $Q_1$ is turned on, making the power supply B+ applied through the resistor $R_8$ pass to ground. Thus, the transistors $Q_3$ and $Q_4$ are turned off because each of their base voltages becomes LOW and the waveform as shown in FIG. 2(G) appears at point g which is connected to the collector of the transistor $Q_1$, resulting in that the left and right channel signals are muted during the time set by the first timing circuit.

In this state, if the deck leaf switch $SW_1$ becomes off, the waveform of FIG. 2(C) appears at point c. Thus, the power supply B+ charged in the capacitor $C_4$ is instantaneously discharged to ground through the diode $D_2$ and the resistor $R_6$ and the waveform of FIG. 2(E) appears at point e, making the transistor $Q_1$ turned off. Therefore, the power supply B+ having the waveform of FIG. 2(G) appears at point g, turns on the transistors $Q_3$ and $Q_4$ and thus the left and right channel signals pass to ground through the transistors $Q_3$ and $Q_4$, resulting in that the pop noise of FIG. 2(B) mixed with the left and right channel signals is removed. At this moment, the transistor $Q_2$ is turned off by the deck leaf switch $SW_1$ which maintains the OFF state.

Figure 2D:
Figure 2E:
Figure 2F:
Figure 2G:

On the other hand, if the deck leaf switch $SW_2$ becomes on as shown in FIG. 2(A), the waveform of FIG. 2(D) appears at point d and the pop noise of FIG. 2(B) occurs in the head switching IC 10. The power supply B+ is applied to the head switching IC 10 through the resistor $R_2$ and the capacitor $C_2$ and drives the head $H_2$. At this moment, however, the left and right channel signals are muted by the transistors $Q_3$ and $Q_4$ which are turned on as described above. Simultaneously, the power supply B+ through the deck leaf switch $SW_2$ is charged to the capacitor $C_5$ through the resistors $R_3$ and $R_4$, making the transistor $Q_1$ turned on, and thus the voltage at point g has the waveform of FIG. 2(G). Therefore, the transistors $Q_3$ and $Q_4$ are turned off, resulting in that the left and right channel signals are normally fed to the next stage after the pop noise is removed.

If the deck leaf switch $SW_2$ becomes off again in the above-described state, the waveform of FIG. 2(D) appears again at point d and the power supply B+ applied to the base of the transistor $Q_1$ is cut off, causing this transistor $Q_1$ turned off. Therefore, the power supply B+ having the waveform of FIG. 2(G) appears at point g and is applied to the bases of the transistors $Q_3$ and $Q_4$. Accordingly, the transistors $Q_3$ and $Q_4$ are turned on and the left and right channel output signals are muted, resulting in that the pop noise of FIG. 2(B) mixed with the signals is removed. At this moment, the transistor $Q_2$ is turned off because the power supply B+ applied to its base is cut off by the OFF-stated deck leaf switch $SW_1$.

On the other hand, if the deck leaf switch $SW_2$ becomes on or off when the other deck leaf switch $SW_1$ remains in the ON state, the pop noise is not mixed with the left and right channel output signals because the electronic switch in the head switching IC 10 is connected to the head $H_1$.

On the contrary, if the deck leaf switch $SW_1$ becomes on or off when the deck leaf switch $SW_2$ remains in the ON state, the waveforms of FIG. 2(C) and 2(D) appear at point c and d respectively, and the electronic switch in the head switching IC 10 is switched from the head $H_2$ to the head $H_1$ in response to the power supply B+ applied through the deck leaf switch $SW_1$. Therefore, when the deck leaf switch $SW_1$ is on, the power supply B+ through the deck leaf switch $SW_1$ is applied to the base of the transistor $Q_2$ through the diode $D_1$, the capacitor $C_3$ and the resistor $R_5$, causing the transistor $Q_2$ turned on, and the power supply B+ at point d as shown in FIG. 2(D) passes to ground through the resistor $R_3$ and the transistor $Q_2$. Thus, the transistor $Q_1$ is then turned off, the waveform of FIG. 2(G) appears at point g and the transistors $Q_3$ and $Q_4$ are turned on, resulting in that the pop noise mixed with the left and right channel output signals is removed.

As described above, every time when the deck leaf switch $SW_1$ or $SW_2$ is activated, the detector section 20 outputs the control signal to the muting section 30 and the left and right channel output signals from the head switching IC 10 can be muted by the muting section 30, causing the audio signals stably fed to the next stage after the pop noise is removed.

From the foregoing, it will be apparent that the present invention provides the advantage that the pop noise which occurs during the actuation of the deck leaf switches of audio systems can be removed thoroughly.

What is claimed is:

1. A pop noise removing circuit for a double deck cassette tape recorder having first and second deck leaf switches and a head switching IC, comprising:

a power supply;

detecting means for detecting the ON-OFF operation of the first and second deck switches;

control signal generating means for generating delayed control signals in response to said detecting means; and means for muting left and right channel output signals from said head switching IC, said muting means being controlled by said control signals generated by said control signal generating means;

said control signal generating means further comprising a first timing circuit for providing a predetermined time delay of said power supply fed to said muting means through the first deck leaf switch, a second timing circuit feeding said power supply through the second leaf deck switch to said muting means, a transistor receiving said power supply through the second leaf deck switch into its collector, and a third timing circuit feeding said power supply through the first deck leaf switch to the base of said transistor.

2. A pop noise removing circuit according to claim 1, wherein said muting means further comprises a transistor means having a base electrode coupled to said control signal generating means, and first and second transistors receiving the collector output of said transistor means into their bases and receiving said left and right channel output signals from said head switching IC into their collectors respectively.

3. A pop noise removing circuit according to claim 2, wherein said transistor means further comprises an emitter electrode coupled to a diode.

* * * * *